(12) United States Patent
Broden et al.

(10) Patent No.: US 6,253,624 B1
(45) Date of Patent: Jul. 3, 2001

(54) FRICTION FLOWMETER

(75) Inventors: David A. Broden, Minnetrista; David E. Wiklund, Eden Prairie, both of MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/006,451

(22) Filed: Jan. 13, 1998

(51) Int. Cl.$^7$ ....................................................... G01F 1/34
(52) U.S. Cl. ......................................................... 73/861.44
(58) Field of Search ............................... 73/756, 861.65, 73/861.44; 702/138

(56) References Cited

U.S. PATENT DOCUMENTS

| | | |
|---|---|---|
| 1,146,409 | 7/1915 | Dolbey . |
| 1,229,718 | 6/1917 | Cole . |
| 2,098,574 | 11/1937 | Doyle ..................................... 73/206 |
| 2,276,580 | 3/1942 | Hofer ..................................... 73/205 |
| 3,407,658 | 10/1968 | Kerbow et al. ......................... 73/205 |
| 3,939,406 | 2/1976 | Billeter et al. . |
| 4,335,605 | 6/1982 | Boyd ..................................... 73/204 |
| 4,361,050 | 11/1982 | Coussot et al. .................... 73/861.47 |
| 4,453,417 | 6/1984 | Moyers .............................. 73/861.42 |
| 5,606,513 | * 2/1997 | Louwagie et al. ................... 364/510 |
| 5,763,787 | * 6/1998 | Gravel et al. .......................... 73/756 |
| 5,773,726 | * 6/1998 | Mahoney et al. ................. 73/861.65 |
| 5,861,561 | 1/1999 | Van Cleve et al. ............... 73/861.52 |

FOREIGN PATENT DOCUMENTS

| | | |
|---|---|---|
| 1573044 | 3/1970 | (DE) . |
| 24 28487 | 1/1975 | (DE) . |
| 4200803 | 7/1993 | (DE) . |
| 19648591 | 2/1998 | (DE) . |
| 19635789 | 5/1998 | (DE) . |
| 0027402 | 4/1981 | (EP) . |
| 6-94490 | 4/1994 | (JP) . |
| 6-137914 | 5/1994 | (JP) . |

OTHER PUBLICATIONS

K.L. Wehmeyer: "Toner Manufacuture", IBM Technical Disclosure Bulletin, vol. 24, No. 1A, Jun., 1981, pp. 421–422.

O. Fiedler: "Strömungs—und Durchflussmesstechnik", R Oldenbourg Verlag, München Wien XP002098805 228260, 1992, pp. 95–98.

* cited by examiner

*Primary Examiner*—Benjamin R. Fuller
*Assistant Examiner*—Jewel Thompson
(74) *Attorney, Agent, or Firm*—Theodore M. Magee; Westman, Champlin & Kelly, P.A.

(57) ABSTRACT

A pressure transmitter produces signals indicative of a flow in a pipe. The transmitter has a pressure sensor that is fluidly coupled to two ports in the pipe, and the pipe has a substantially constant cross-section between the two ports. Aspects of the invention include a circuit coupled to the pressure sensor that produces a digital value related to the fluid flow as a function of the pressure difference between the two ports.

23 Claims, 8 Drawing Sheets

FRICTION FLOWMETER

REFERENCE TO CO-PENDING APPLICATION

This application is related to a U.S. application filed on even date herewith entitled FRICTION FLOWMETER WITH IMPROVED SOFTWARE, Ser No. 09/006,452 filed Jan 13, 1998. Both applications are owned by a common assignee.

BACKGROUND OF THE INVENTION

The present invention relates to transmitters for process control. In particular, the present invention relates to pressure transmitters which measure flow.

In process control, fluid movement through pipes is monitored by a series of process control transmitters connected to the pipes. The transmitters contain sensors that sense the difference between two pressures in a pipe (i.e. a differential pressure). From the differential pressure measurement, these transmitters infer the mass flow rate of the fluid in the pipe.

Generally, transmitters sense the differential pressure across an obstruction in the pipe. A typical obstruction is an orifice plate, which is a perforated disk inserted into the pipe. Although such disks provide a large and easily sensed pressure drop, they complicate the mass flow rate calculation because a number of compensation factors must be added to the calculation to account for fluid flow disruptions created by the disk. The disks also cause a substantial loss in pressure in the pipe. This reduction in pressure constitutes a needless and costly waste of energy.

SUMMARY OF THE INVENTION

A pressure transmitter produces signals indicative of a flow in a pipe. The transmitter has a pressure sensor that is fluidly coupled to two ports in the pipe, and the pipe has a substantially constant cross-section between the two ports. Aspects of the invention include a circuit coupled to the pressure sensor that produces a digital value related to the fluid flow as a function of the pressure difference between the two ports.

DETAILED DESCRIPTION OF THE PREFERRED EMBODIMENTS

One aspect of the present invention eliminates the need for orifice plates in the pipe by accurately sensing the pressure drop that occurs along a section of pipe free of internal obstructions and having a substantially constant cross-section. Based on this accurate measurement, the present invention uses novel techniques to produce digital values related to the fluid flow.

Figure 1:
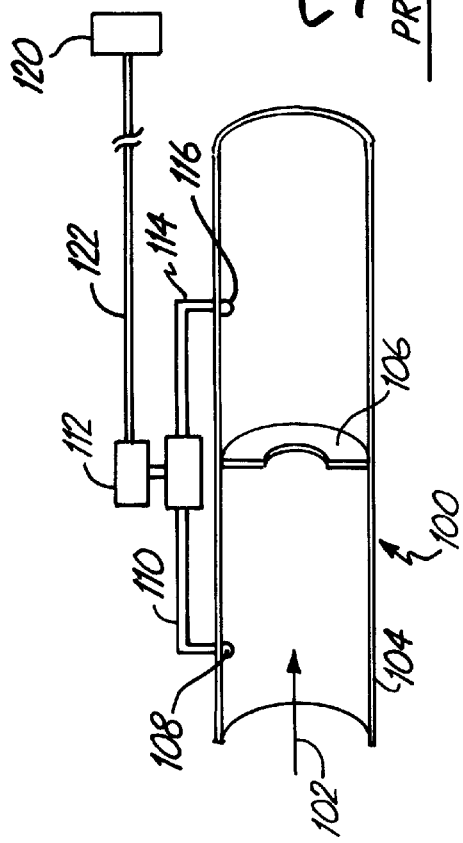
FIG. 1 is a prior art mass flow rate measuring system.

FIG. 1 shows a prior art mass flow rate measuring system 100. A fluid flows in direction 102 through pipe 104, which contains orifice plate 106. Upstream from orifice plate 106, aperture 108 provides fluid communication between pipe 104 and conduit 110. Conduit 110 extends from aperture 108 to transmitter 112 and second conduit 114 extends from transmitter 112 to downstream aperture 116. Sensors in transmitter 112 form a differential pressure signal indicative of the pressure difference between aperture 108 and aperture 116. This differential pressure signal is communicated to control room 120 through process control lines 122.

The pressure drop created by orifice plate 106 is relatively large, making it easier for sensors in transmitter 112 to accurately sense the pressure difference between the two ports. However, this large pressure drop represents a significant and costly energy loss because energy is required to pressurize the fluid. Moreover, since there are sometimes tens of transmitters monitoring mass flow rate on a single length of pipe, the added pressurization for each orifice plate is multiplied by the total number of transmitters and results in a large, costly, and unnecessary waste of energy.

In addition, to insert the transmitter of the prior art into a pipe, a section of pipe has to b removed so that the orifice plate may be inserted. This is a costly procedure that increase the possibility of leaks in the pipe system.

Orifice plates are also undesirable because certain process flows include matter that tends to become trapped in the orifice plate. This causes additional maintenance and increases the wasteful pressure drop due to the orifice plate. Such plate contamination also decreases the accuracy of the flow rate measurement made by transmitters of the prior art.

Figure 2:
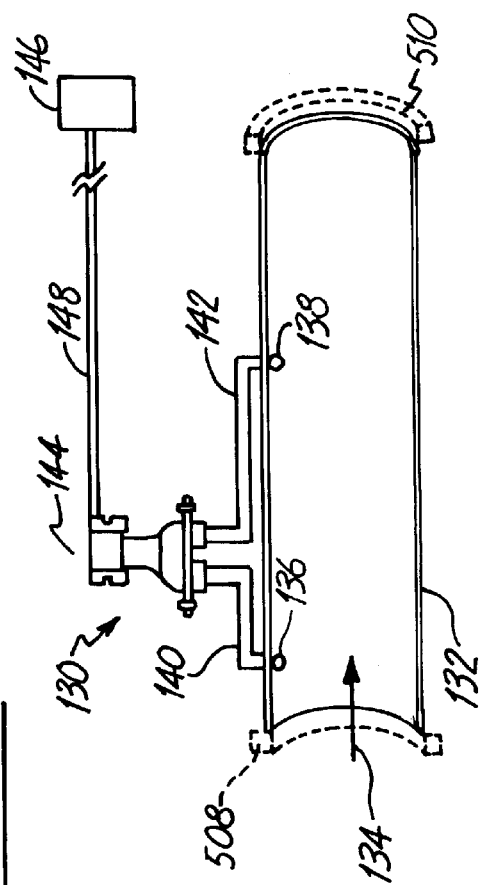
FIG. 2 is an embodiment of a mass flow rate transmitter system of the present invention.

FIG. 2 shows a pressure measuring system 130 of the present invention. Pipe 132 carries a fluid flowing in direction 134 past apertures 136 and 138. Apertures 136 and 138 open to impulse pipes 140 and 142, respectively. Impulse pipes 140 and 142, preferably matched, are connected to transmitter 144, which contains a differential pressure sensor (shown in detail below). Transmitter 144 may comprise any type of "transmitter" as the term is used in the process control industry such as the model 1151 or model 3051 transmitters available from Rosemount Inc. of Eden Prairie, Minn. The differential pressure sensor produces a differential pressure signal which is communicated from transmitter 144 to control room 146 through process control loop 148. Loop 148 can operate in accordance with various industry standards such as 4–20 mA, HART®, FieldBus, ProfiBus, etc. In one embodiment, transmitter 144 is completely powered by power received from loop 148.

One aspect of a transmitter in accordance with the invention includes a recognition that due to friction between the fluid and the pipe, there is a linear pressure drop from aperture 136 to aperture 138 and that the square root of this pressure drop is proportional to the velocity of the fluid.

Figure 3:
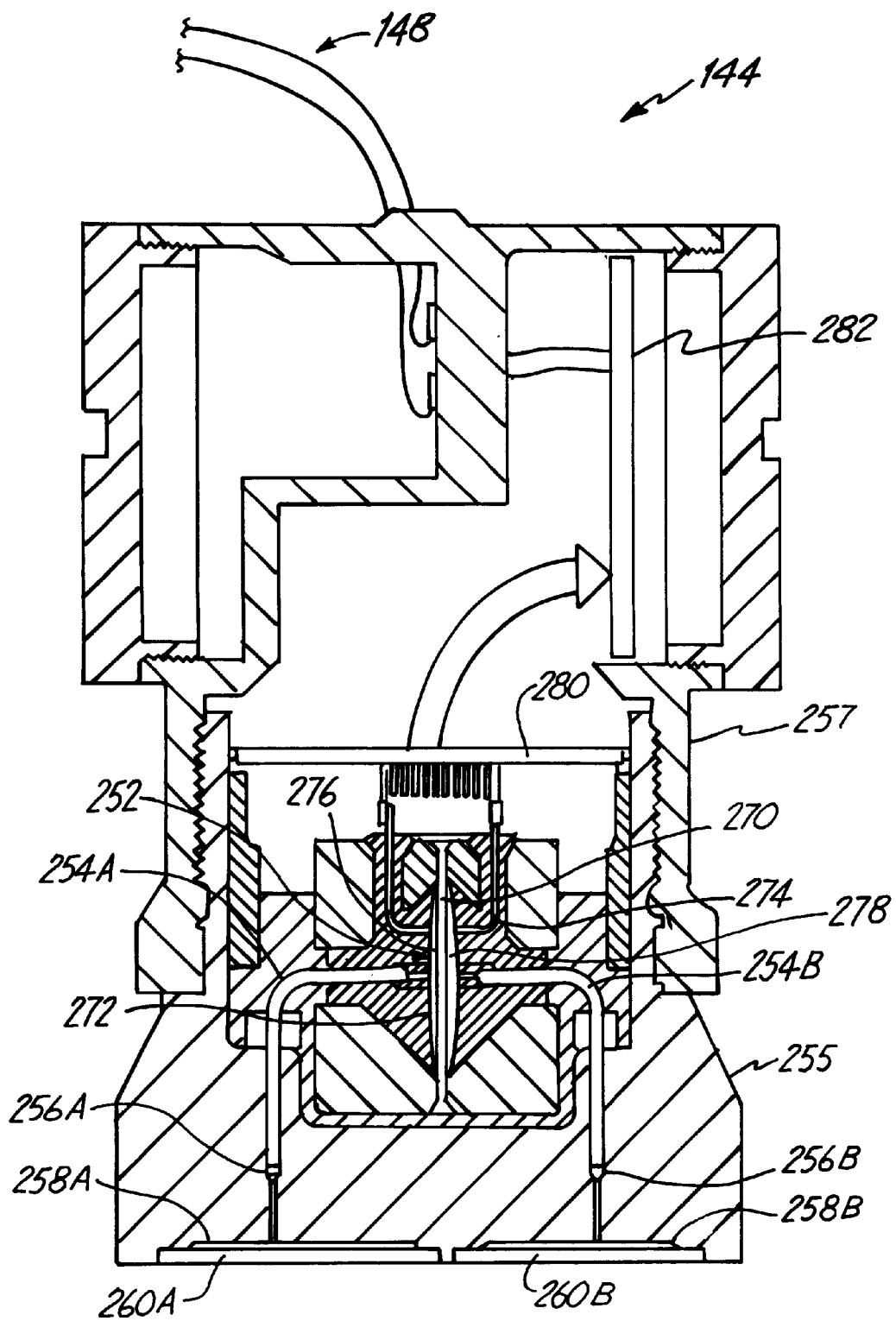
FIG. 3 is a cross-sectional view of a mass flow rate transmitter that can be used with the present invention.

FIG. 3 shows a cross-section of coplanar transmitter 144 of FIG. 2 having a lower sensor housing 255 and an upper electronics module 257. Transmitter 144 has two isolator diaphragms 260A and 260B that are in fluid communication with impulse piping 140 and 142 (not shown in FIG. 3). Isolator diaphragms 260A and 260B transmit the pressure in impulse piping 140 and 142, respectively, to two fluid communication channels, formed by chambers 258A, 258B, respectively, passageways 256A, 256B, respectively and inlet tubes 254A, 254B, respectively. Differential pressure sensor 252 is positioned between inlet tubes 254A, 254B, and includes sensing diaphragm 270 welded between capacitive plates 272, 274, which form chambers 276, 278, respectively. Pressure differences between chambers 276, 278 cause sensing diaphragm 270 to deflect thereby changing the capacitances between capacitive plates 272, 274 and sensing diaphragm 270. Sensor board 280 compensates signals that are based on these capacitances and output circuit board 282 produces related outputs on process control loop 148.

Figure 4:
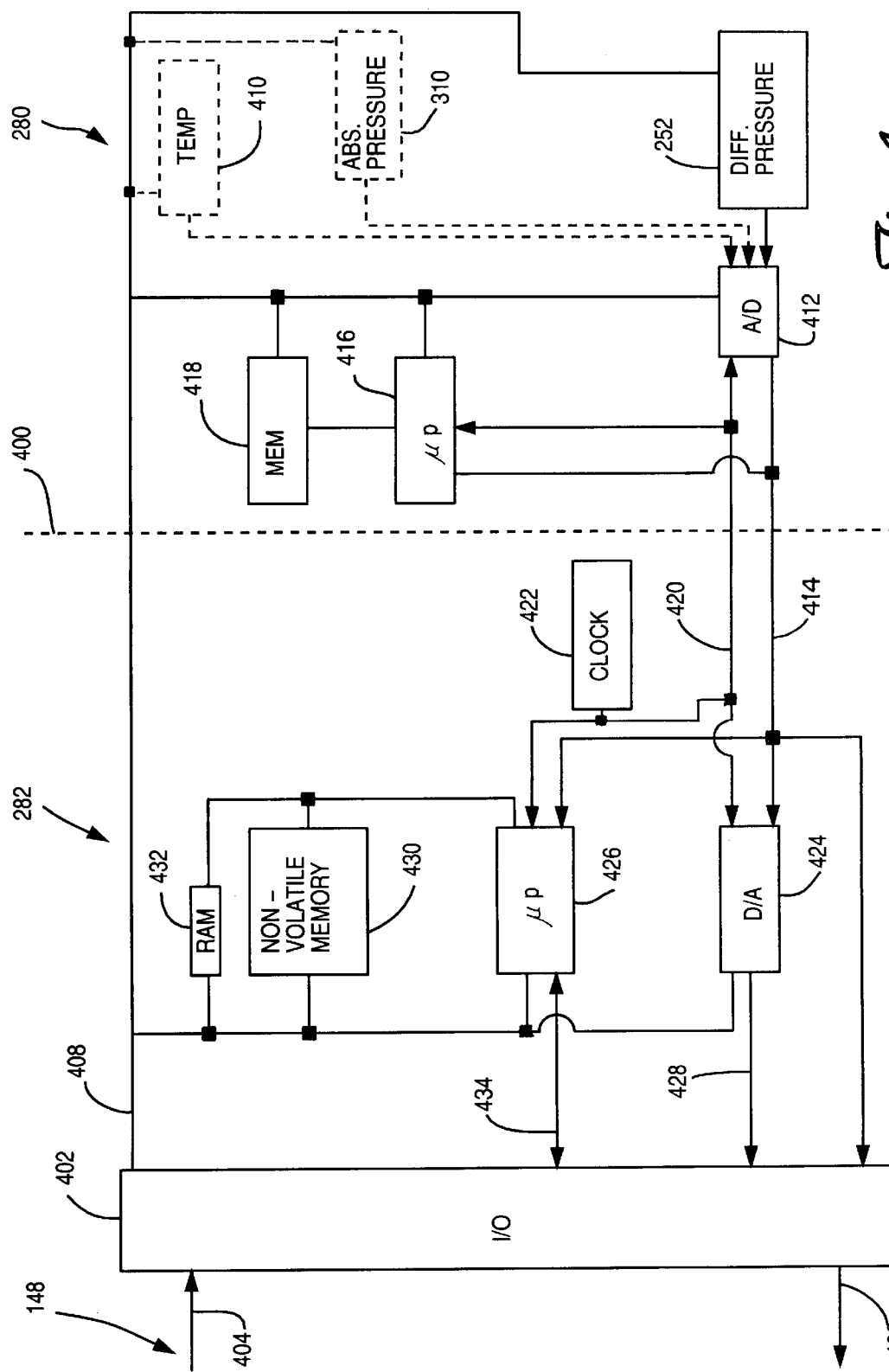
FIG. 4 is a block diagram of a conditioning circuit associated with the transmitter of FIG. 3.

FIG. 4 is a block diagram of electronics on sensor board 280 and output circuit board 282. Electronic components to the left of broken line 400 in FIG. 4 are located on output circuit board 282, whereas components to the right of line 400 are located on sensor board 280. Sensor board 280 is located in sensor housing 255 of transmitter 144, and output circuit board 282 is located in electronics module 257 of transmitter 144.

Output circuit board 282 includes input/output circuit 402 that converts power from control loop 148 into power supply voltages on bus 408. Multiple channel analog-to-digital converter 412 is connected to differential pressure sensor 252 and provides signals on bus 414 representative of sensed differential pressure to microprocessor 416. In alternative embodiments, analog-to-digital converter 412 also receives signals from a temperature sensor 410 and an absolute pressure sensor 310. A memory 418 preferably stores information about the sensors and sensor board 280. The system operates in accordance with clock signal 420 from clock 422. If the output of transmitter 144 is analog, digital-to-analog converter 424 converts digital signals on bus 414 into analog signals that pass to input/output circuitry 402 along analog line 428. If the output of transmitter 144 is digital, as in the Fieldbus protocol, or is a mix of analog and digital, as in the HART protocol, the digital signals on bus 414 pass directly to input/output circuitry 402.

Microprocessor 426 receives digital signals on bus 414 and is connected to non-volatile memory 430 and random access memory 432. Microprocessor 426 also receives digital signals along bi-directional bus 434 from input/output circuitry 402. Examples of the digital signals received from input/output circuitry 402 include signals representative of the pipe's diameter, and the pipe's relative roughness, which can be used in calculating mass flow rate as discussed below.

One of the benefits of the present invention is that it facilitates mass flow rate calculations that use fewer empirically determined terms and thus produce more accurate results. In the past, mass flow rate was calculated using an orifice plate and the equation:

$$Q_{mass} = NC_d EY_1 d^2 \sqrt{(\Delta P)\rho} \qquad \text{Equation 1}$$

Where Q is the mass flow rate; N is a units conversion factor; $C_d$ is a discharge coefficient; E is a velocity of approach factor; $Y_1$ is a gas expansion factor; d is a bore of differential producer; $\rho$ is fluid density; and $\Delta P$ is the differential pressure measured by the differential pressure sensor. Many of these terms must be adjusted to accommodate the particular fluid in the pipe, and some require continuous refinement to accommodate changes in the temperature or static pressure of the fluid.

Without the orifice plate, several factors are eliminated from equation 1. In particular, E, the velocity of approach factor; $Y_1$, the gas expansion factor; and d, the bore of the differential producer, are each a constant under the present invention. Thus, the equation for mass flow rate under the present invention reduces to:

$$Q_{mass} = C_d k_1 \sqrt{(\Delta P)\rho} \qquad \text{Equation 2}$$

Where $k_1$ is a constant; $C_d$ is a friction factor coefficient; $\Delta P$ is the differential pressure; and $\rho$ is the fluid density.

In prior art systems, the discharge coefficient, $C_d$, is a function of the shape of the bore in the orifice plate, as well as the velocity, density, and viscosity of the flow. In the present invention, the discharge coefficient is converted into a friction factor coefficient, which is a function of two variables: a Reynolds number and the friction factor for the pipe.

Figure 5:
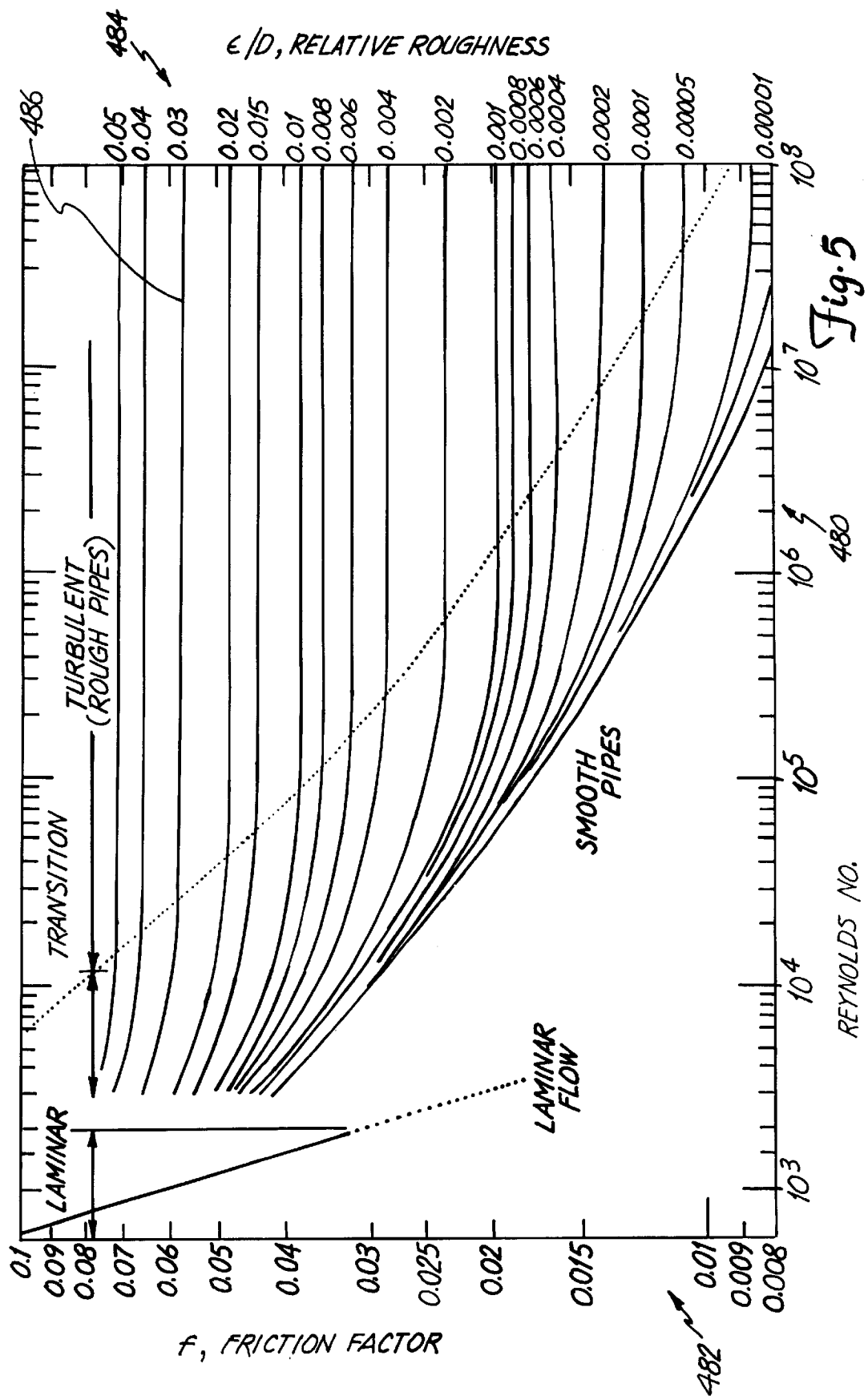
FIG. 5 is a graph of Reynolds Number as a function of friction factor and pipe roughness.

As shown in the graph of FIG. 5, the friction factor is related to the Reynolds number and to the relative roughness of the pipe. In FIG. 5 the Reynolds number is shown on horizontal axis 480, the friction factor is shown on left-hand vertical axis 482, and the relative roughness of the pipe is shown on right-hand vertical axis 484. For small Reynolds numbers, those below $5 \cdot 10^3$, the relationship between friction factor and the Reynolds number is linear and independent of the relative roughness of the pipe. For higher Reynolds numbers, the relationship between the friction factor and the Reynolds number depends on the relative roughness of the pipe. This relationship can be stored in the transmitter in a look-up table or calculated based on an empirical equation.

In FIG. 5, several different lines representing different relationships between friction factor and the Reynolds number are shown for different relative roughnesses. For example, line 486 shows a relationship between friction factor and Reynolds number at a relative pipe roughness of 0.03.

The Reynolds number is a function of the mass flow rate and can be calculated using the following equation:

$$R_D = \frac{4Q}{\pi D \mu} \qquad \text{Equation 3}$$

Where $R_D$ is the Reynolds number; Q is the mass flow rate; $\pi$ is a mathematical constant; D is the inner diameter of the pipe; and $\mu$ is the viscosity of the fluid.

Figure 6:
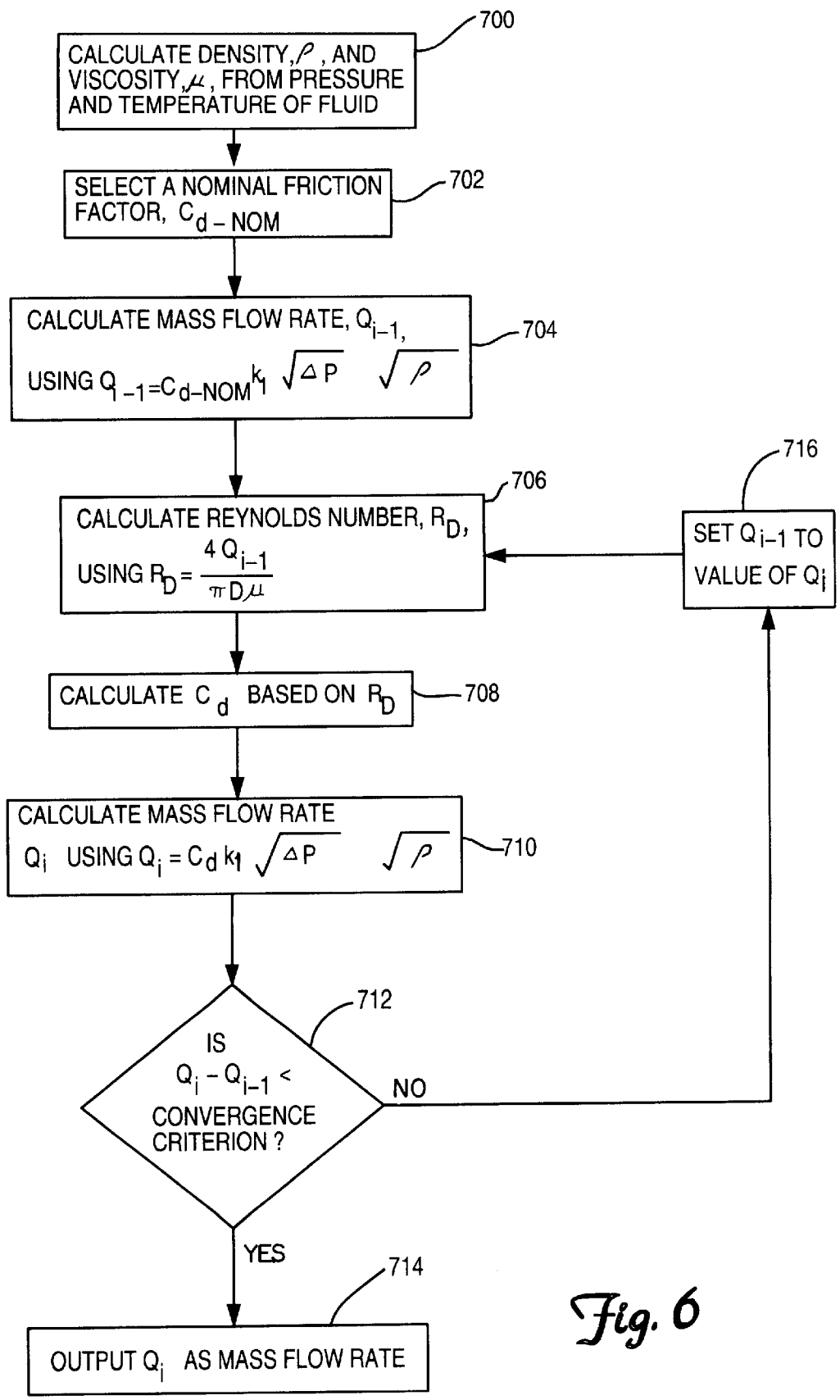
FIG. 6 is a flow diagram of a method for calculating mass flow rate under the present invention.

Because of the interdependence of their variables, Equations 2 and 3 may be solved through an iterative approach, which is shown in the flow diagram of FIG. 6. First step 700 calculates the density, $\rho$, and viscosity, $\mu$, from the pressure and temperature of the fluid. Next, a nominal friction factor coefficient is selected at step 702. This nominal value is chosen based on expected friction factor coefficients for the particular fluid flow. Step 704 calculates the mass flow rate, $Q_{i-1}$, using the nominal friction factor coefficient and the equation:

$$Q_{i-1} = C_{d-nom} k_1 \sqrt{\Delta P} \sqrt{\rho} \qquad \text{Equation 4}$$

Where $Q_{i-1}$ is a mass flow rate; $C_{d-nom}$ is the nominal friction factor coefficient; $k_1$ is a constant; $\Delta P$ is a differential pressure; and $\rho$ is the density of the fluid.

The Reynolds number, $R_D$, is calculated in step 706 using Equation 3 and $Q_{i-1}$ of Equation 4. Based on the calculated $R_D$ and an empirical or theoretical relationship between $R_D$ and the friction factor coefficient, $C_d$, step 708 calculates a value for friction factor coefficient, $C_d$.

Step 710 calculates a current mass flow rate, $Q_i$, using Equation 2 and the calculated friction factor coefficient $C_d$. Decision step 712 compares a convergence criteria to the difference between the current mass flow rate, $Q_i$, and the previously calculated mass flow rate, $Q_{i-1}$. If the difference between the current mass flow rate and the last calculated mass flow rate is less than the convergence criteria, the current mass flow rate, $Q_i$, is output as the calculated flow rate at step 714. If the difference between the two mass flow rates is not less than the convergence criteria, the value of the current mass flow rate is assigned as the previous mass flow rate, $Q_{i-1}$, in step 716 and steps 706, 708, 710, and 712 are repeated.

Figure 7:
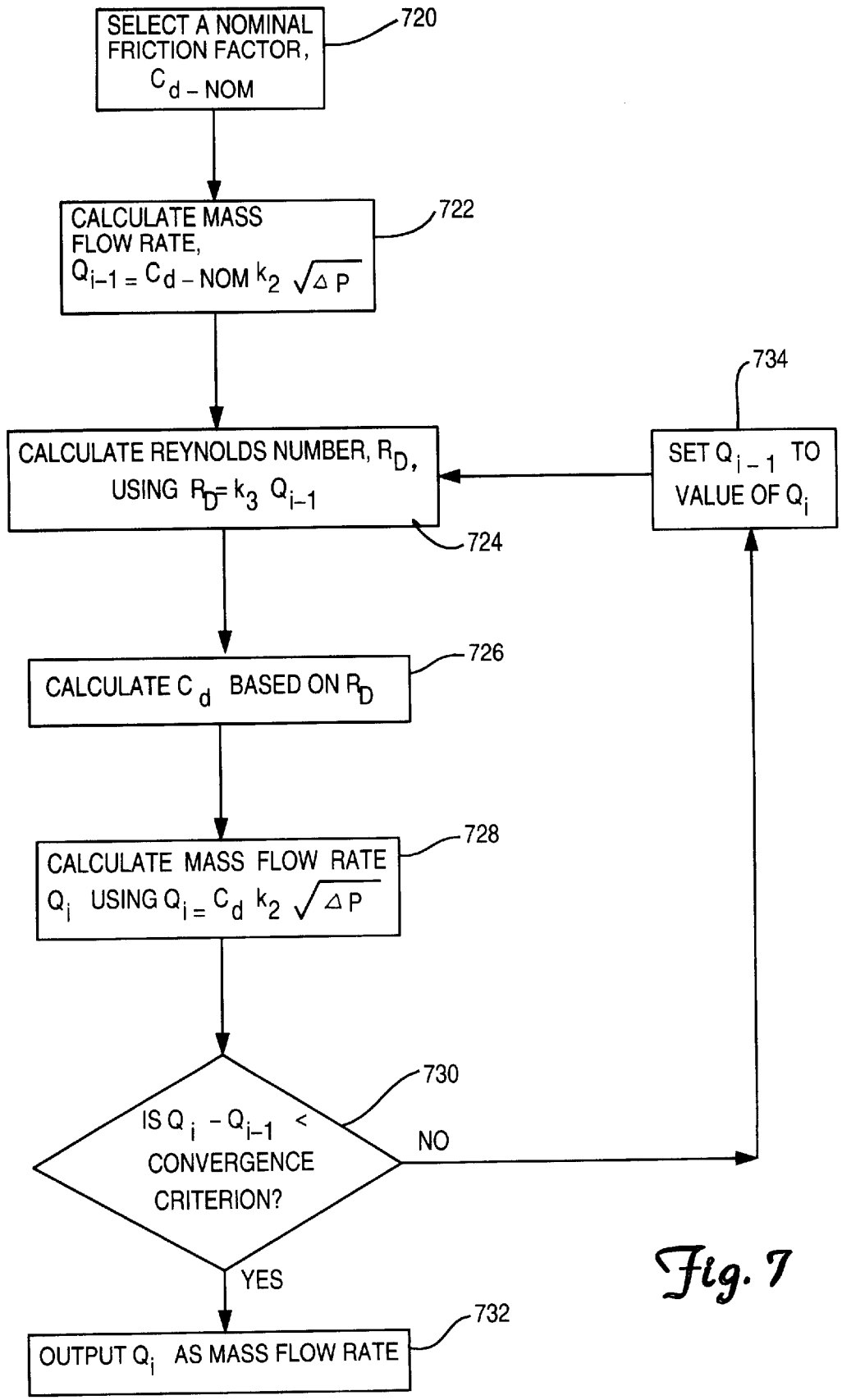
FIG. 7 is a flow diagram of a second method for calculating mass flow rate under the present invention.

To further simplify calculations, the density and viscosity can be assumed to be constant. A flow diagram of a method for calculating the mass flow rate when assuming constant density and viscosity is shown in FIG. 7, where a nominal friction factor coefficient is selected in step 720. This nominal friction factor coefficient is used to calculate a mass flow rate, $Q_{i-1}$, in step 722 using the equation:

$$Q_{i-1} = C_{d-nom} k_2 \sqrt{\Delta P} \qquad \text{Equation 5}$$

Where $C_{d-nom}$ is the nominal friction factor coefficient; $K_2$ is a constant; and $\Delta P$ is the differential pressure. The specific value of $K_2$ depends on many factors including the inner diameter of the pipe and the distance between differential pressure ports. In step 724, the calculated mass flow rate, $Q_{i-1}$, is used to calculate a Reynolds number, $R_D$, using the following equation:

$$R_D = k_3 Q_{i-1} \qquad \text{Equation 6}$$

Where $K_3$ is a constant that is equal to four divided by the product of the viscosity of the flow, the inner diameter of the pipe and $\pi$.

Based on the calculated $R_D$, a friction factor coefficient, $C_d$, is calculated in step 726. The friction factor coefficient can either be based on an empirical relationship or on a theoretical relationship between $R_D$ and $C_d$. Once $C_d$ is calculated, a current mass flow rate, $Q_i$, is calculated in step 728 using the equation:

$$Q_i = C_d k_2 \sqrt{\Delta P} \qquad \text{Equation 7}$$

Where $K_2$ is the same constant used in Equation 5.

In decision box 730, the current mass flow rate, $Q_i$, is compared to the previous mass flow rate, $Q_{i-1}$, to determine if the difference between the two is less than a convergence criteria. If the difference is less than the convergence criteria, the current mass flow rate, $Q_i$, is output as the mass flow rate in step 732. If the difference is not less than the convergence criteria, the previous mass flow rate variable, $Q_{i-1}$, is set to the value of the current mass flow rate in step 734, and steps 724, 726, 728, and 730 are repeated.

At sufficiently high Reynolds numbers, the friction factor is constant and the mass flow rate is not dependent on the Reynolds number, the viscosity or the density of the fluid. For such Reynolds numbers, the equation for calculating mass flow rate becomes:

$$Q = k_4 \sqrt{\Delta P} \sqrt{p} \qquad \text{Equation 8}$$

Where p is the density, Q is the mass flow rate; $K_4$ is a constant; and $\Delta P$ is the differential pressure. Since friction factor is a constant, it is folded into constant $K_4$. No iterations are needed if the Reynolds number is considered constant.

Figure 8:
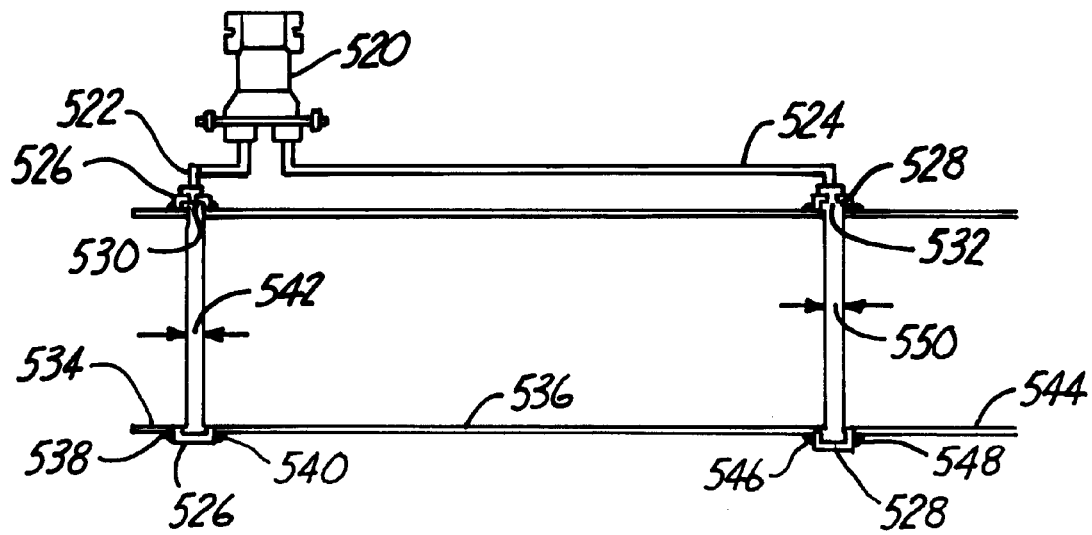
FIG. 8 is a second embodiment of the mass flow rate transmitter system of the present invention.

The present invention can be used with several different port shapes. For instance, in FIG. 8, a transmitter 520 of the present invention is connected to impulse piping 522 and 524, which are in fluid communication with the interior of annular sleeves 526 and 528, through apertures 530 and 532, respectively. Sleeve 526 is welded to pipe sections 534 and 536 at annular welds 538 and 540, respectively, such that an annular gap 542 remains between the two pipe sections. Similarly, sleeve 528 is connected to pipe sections 544 and 536 by annular welds 546 and 548, respectively, such that a gap 550 remains between the two pipe sections. Annular sleeves 526 and 528 help to eliminate pressure reading errors caused by localized swirls in the flow.

Figure 9:
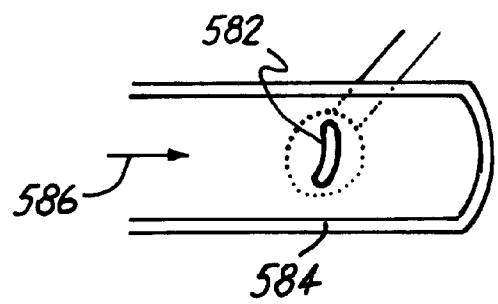
FIG. 9 is an elliptical port.

FIG. 9 shows a second embodiment of a port connection to a pipe. In particular, port 582 forms an aperture that is not round, but instead is elliptical with a dimension transverse to the general fluid flow direction 586 that is larger than its dimension in the direction of general fluid flow 586.

Figure 10:
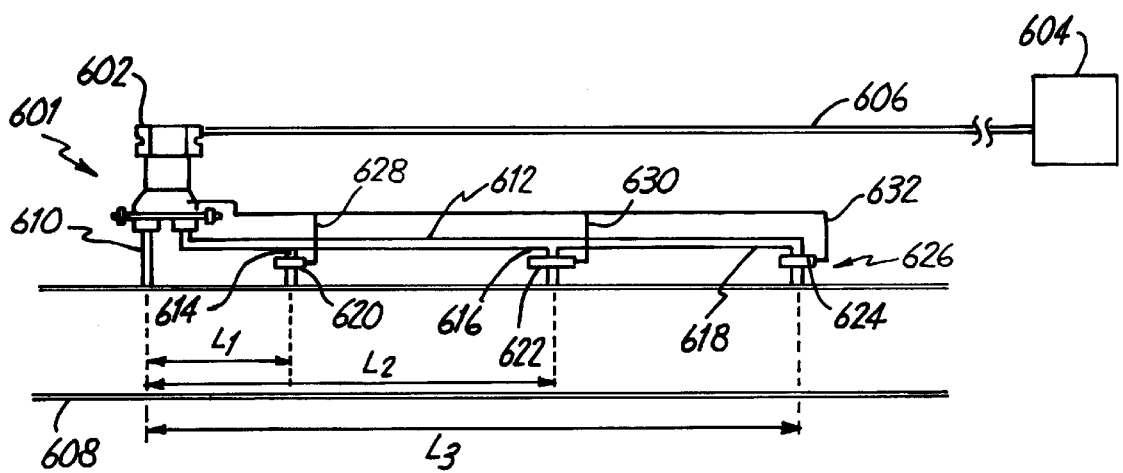
FIG. 10 is a third embodiment of the mass flow rate transmitter system of the present invention.

FIG. 10 shows a pressure transmitter assembly 601 of the present invention that includes transmitter 602 connected to control module 604 through control lines 606. Transmitter 602 is connected to pipe 608 through first conduit 610 and conduit assembly 612 constructed from second conduit 614, third conduit 616 and fourth conduit 618. Valves 620, 622 and 624 of valve assembly 626 separate conduits 614, 616 and 618, respectively, from pipe 608. Valves 620, 622 and 624 are controlled through control lines 628, 630 and 632, respectively, which are attached to transmitter 602. Valves 620, 630 and 632 are either controlled directly by transmitter 602 or by control module 604 through transmitter 602.

Pressure transmitter assembly 601 allows the pressure sensor in pressure transmitter 602 to tap into different locations along the length of the pipe. If the fluid flow does not produce enough differential pressure between conduits 610 and 614, valves 620 and 624 can be shut and valve 622 can be opened. By shutting valves 620 and 624 and opening valve 622, the differential pressure is measured between conduits 610 and 616. Since conduit 616 is located further from conduit 610, the pressure drop from conduit 610 to conduit 616 is greater than the pressure drop from conduit 610 to conduit 614. By increasing the pressure drop between the two conduits connected to the sensor, a differential pressure can be delivered to the sensor that is within the range of the sensor.

Similarly, if the fluid flow creates too much differential pressure between conduit 610 and 618, valve 624 can be closed and valve 620 can be opened to reduce the differential pressure provided to the sensor. Similarly, if the pressure between conduit 616 and 610 is too great for the sensor, valves 622 and 624 can be closed and valve 620 can be opened, so that the measured pressure drop is between conduits 610 and 614.

In order to ease calculations, the transmitter can be associated with a spool of pipe that has been manufactured to have a desired relative roughness. Such a spool section is shown in outline form in FIG. 2 where two flanged ends 508 and 510 are formed on the ends of pipe 132 to allow the spool section to be dropped within and connected to an opening in a pipe line. The roughness of the spool may be produced during casting of the pipe; through abrasion, such as sand blasting; or through spiral grooves cut into all or part of the pipe surface.

Although the present invention has been described with reference to preferred embodiments, workers skilled in the art will recognize that changes may be made in form and detail without departing from the spirit and scope of the invention.

What is claimed is:

1. A transmitter for producing signals indicative of a flow in a pipe, the transmitter comprising:

first and second ports for fluidly connecting the transmitter to a first location and a second location in the flow that are separated by a pipe section having a substantially constant cross-sectional area between the two locations the first port and second port being separate from each other such that flow is prevented from moving between the first port and the second port within the transmitter;

a pressure sensor, fluidly coupled to the first and second ports, adapted to provide a sensor output in response to a pressure at the first port and a pressure at the second port; and a circuit, coupled to the pressure sensor, for receiving the sensor output and for providing at least one digital value that is related to the flow and is a function of the pressure at the first port and the pressure at the second port.

2. The transmitter of claim 1 wherein a section of pipe between the first location and the second location has a roughness to inner diameter ratio that causes a friction factor of the section of pipe to be constant over a range of Reynolds numbers.

3. The transmitter of claim 1 wherein the circuit comprises an analog-to-digital converter for converting the sensor output into a series of digital values.

4. The transmitter of claim 3 wherein the circuit further comprises a digital memory for storing compensation values that facilitate compensating the sensor output to produce a more accurate indication of the pressures sensed by the sensor.

5. The transmitter of claim 4 wherein the circuit further comprises a microprocessor connected to the digital memory and the analog-to-digital converter, the microprocessor capable of compensating the sensor output based on the compensation values stored in the digital memory.

6. The transmitter of claim 5 wherein the microprocessor is further capable of performing diagnostic tests on the sensor means.

7. The transmitter of claim 1 further comprising a temperature sensor for providing a temperature signal.

8. The transmitter of claim 7 further comprising an absolute pressure sensor for producing an absolute pressure signal.

9. The transmitter of claim 8 wherein the circuit comprises a microprocessor for receiving signals representative of the temperature signal, the absolute pressure signal and the sensor output and capable of calculating a mass flow rate of the flow in the pipe.

10. The transmitter of claim 1 wherein the first port is fluidly connected to the flow in the pipe through an aperture in the pipe, the flow having a direction of fluid flow through the pipe, the aperture in the pipe having a dimension transverse to the direction of fluid flow and a dimension parallel to the direction of fluid flow, the dimension transverse to the direction of fluid flow larger than the dimension parallel to the direction of fluid flow.

11. The transmitter of claim 10 wherein the opening in the pipe is an annular opening forming two separate pipe sections, the two pipe sections connected together by a sealing ring that is sealingly connected to both sections of pipe and that has an opening permitting fluid connection between the first port and the flow in the pipe.

12. The transmitter of claim 1 wherein the second port is fluidly connected to the flow in the pipe through a portion of a conduit assembly and a valve assembly, the conduit assembly and valve assembly for selecting between at least two positions that are separate from the first location for the position of the second location, the conduit assembly having at least two conduits, each conduit having a first end in fluid communication with the second port and a second end in fluid communication with the flow in the pipe, each conduit having a respective valve of the valve assembly between each conduit's first end and second end, each valve controlling fluid communication between the first end and second end of its respective conduit.

13. The transmitter of claim 1 further comprising a memory, the memory capable of storing relationships between Reynolds numbers and friction factors.

14. The transmitter of claim 1 wherein the transmitter is capable of receiving a parameter signal remote from the transmitter, the parameter signal indicative of a parameter of the pipe.

15. The transmitter of claim 14 wherein the parameter signal is indicative of the diameter of the pipe.

16. The transmitter of claim 14 wherein the parameter signal is indicative of the roughness of the pipe.

17. A transmitter assembly for measuring pressures of a fluid in a member, the transmitter assembly comprising:

a pressure sensor;

a first fluid communication channel having a first end in fluid communication with the pressure sensor, a second end in fluid communication with the fluid in the member, and a first valve for controlling fluid communication between the first end and the second end of the first fluid communication channel;

a second fluid communication channel having a first end in fluid communication with the first end of the first fluid communication channel, a second end in fluid communication with the fluid in the member, and a second valve for controlling fluid communication between the first end and second end of the second fluid communication channel; and a valve control coupled to the first and second valves for controlling the valves to provide fluid communication between the sensor and only one of the second end of the first fluid communication channel and the second end of the second fluid communication channel.

18. The transmitter assembly of claim 17 wherein the member is a pipeline containing a flowing fluid.

19. The transmitter assembly of claim 18 further comprising a third fluid communication channel having a first end in fluid communication with the sensor and a second end in fluid communication with the fluid in the pipeline.

20. The transmitter assembly of claim 19 wherein the pressure sensor is a differential pressure sensor having a first diaphragm in fluid communication with the first end of the third fluid communication channel, and a second diaphragm in fluid communication with the respective first ends of the first and second fluid communication channels.

21. The transmitter assembly of claim 20 wherein the differential pressure sensor has a maximum pressure difference that can exist between the first diaphragm and the second diaphragm, and the pressure difference between the second end of the third fluid communication channel and the second end of the second fluid communication channel exceeds the maximum pressure difference while the pressure difference between the second end of the third fluid communication channel and the second end of the first communication channel is less than the maximum pressure difference.

22. The transmitter assembly of claim 20 wherein there is a minimum pressure difference between the first diaphragm and the second diaphragm that can be sensed by the differential pressure sensor, and the pressure difference between the second end of the third fluid communication channel and the second end of the first fluid communication channel is less than the minimum pressure difference while the pressure difference between the second end of the third communication channel and the second end of the second communication channel exceeds the minimum pressure difference.

23. The transmitter assembly of claim 19 wherein the second end of the first fluid communication channel is a first distance along the pipe from the second end of the third fluid communication channel, and the second end of the second fluid communication channel is a second distance along the pipe from the second end of the third fluid communication channel, the second distance greater than the first distance.

* * * * *